(12) United States Patent
Kung (10) Patent No.: US 7,118,079 B2
(45) Date of Patent: Oct. 10, 2006

(54) TELESCOPE WITH FOLDABLE AND EXTENDABLE BASE

(75) Inventor: Su-Min Kung, Shi-Jr (TW)

(73) Assignee: Hunter Optical Co., Ltd., Taipei Hsien (TW)

( * ) Notice: Subject to any disclaimer, the term of this patent is extended or adjusted under 35 U.S.C. 154(b) by 0 days.

(21) Appl. No.: 11/123,037

(22) Filed: May 6, 2005

(65) Prior Publication Data

US 2006/0175478 A1 Aug. 10, 2006

(30) Foreign Application Priority Data

Jan. 11, 2005 (TW) .............................. 94100743 A (51) Int. Cl.
*A47F 5/00* (2006.01)
(52) U.S. Cl. ................ 248/125.8; 248/166; 248/183.1; 248/187.1; 248/460; 403/112
(58) Field of Classification Search ................ 248/121, 248/125.8, 125.7, 125.9, 177.1, 183.1, 187.1, 248/166, 460, 136, 176.3, 188; 403/112, 403/113, 116, 62
See application file for complete search history.

(56) References Cited

U.S. PATENT DOCUMENTS

| | | | | |
|---|---|---|---|---|
| 1,612,148 A | * | 12/1926 | Oettinger | 211/85.6 |
| 2,128,409 A | * | 8/1938 | Hager | 248/158 |
| 3,351,408 A | * | 11/1967 | Krewalk | 359/355 |
| 4,279,463 A | * | 7/1981 | Little | 359/399 |
| 4,934,025 A | * | 6/1990 | Mariol | 16/347 |
| 5,069,238 A | * | 12/1991 | Marks | 135/153 |
| 5,154,381 A | * | 10/1992 | Malinao | 248/178.1 |
| 5,375,497 A | * | 12/1994 | Pirchio et al. | 84/327 |
| 5,772,162 A | * | 6/1998 | Lin | 248/121 |
| 6,007,032 A | * | 12/1999 | Kuo | 248/185.1 |
| 6,121,527 A | * | 9/2000 | Hamm | 84/327 |
| 6,814,332 B1 | * | 11/2004 | Eason | 248/122.1 |
| D522,550 S | * | 6/2006 | Kung | D16/132 |

* cited by examiner

*Primary Examiner*—Gwendolyn Baxter
*Assistant Examiner*—Tan Le
(74) *Attorney, Agent, or Firm*—Pro-TECHTOR International Serv (57) ABSTRACT

A telescope with a foldable and extendable base that can be extended before use and folded after use, including a telescope main body being cradled in a socket; a stanchion having an upper joint connecting to a joint base of the socket; a left base having a ring with an arc external cover and a left leg on a lateral; a right base having a circular groove with an arc body and a right leg on a lateral; a sliding base having an upper hinge for connecting with a lower joint of the stanchion through a bolt and a nut; a bolt passing through the circular groove and the bolting hole of the sliding base to enable the sliding base sliding round the ring and the arc external cover sliding round the arc body.

5 Claims, 10 Drawing Sheets

TELESCOPE WITH FOLDABLE AND EXTENDABLE BASE

BACKGROUND OF THE INVENTION (a) Field of the Invention

The present invention relates to a telescope with a foldable and extendable base and more particularly for the base being able to be extended before use and folded after use.

(b) Description of the Prior Art

A conventional telescope usually comes with a separate tripod, which is not convenient and involves time-consuming processes to both mount and dismount the telescope thereon, besides having to store the telescope and the tripod separately in cases.

SUMMARY OF THE INVENTION

It is an objective of the present invention to enable a foldable and extendable base of a telescope being easy in assembling and disassembling in order for the telescope base being extended before use and folded after use.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
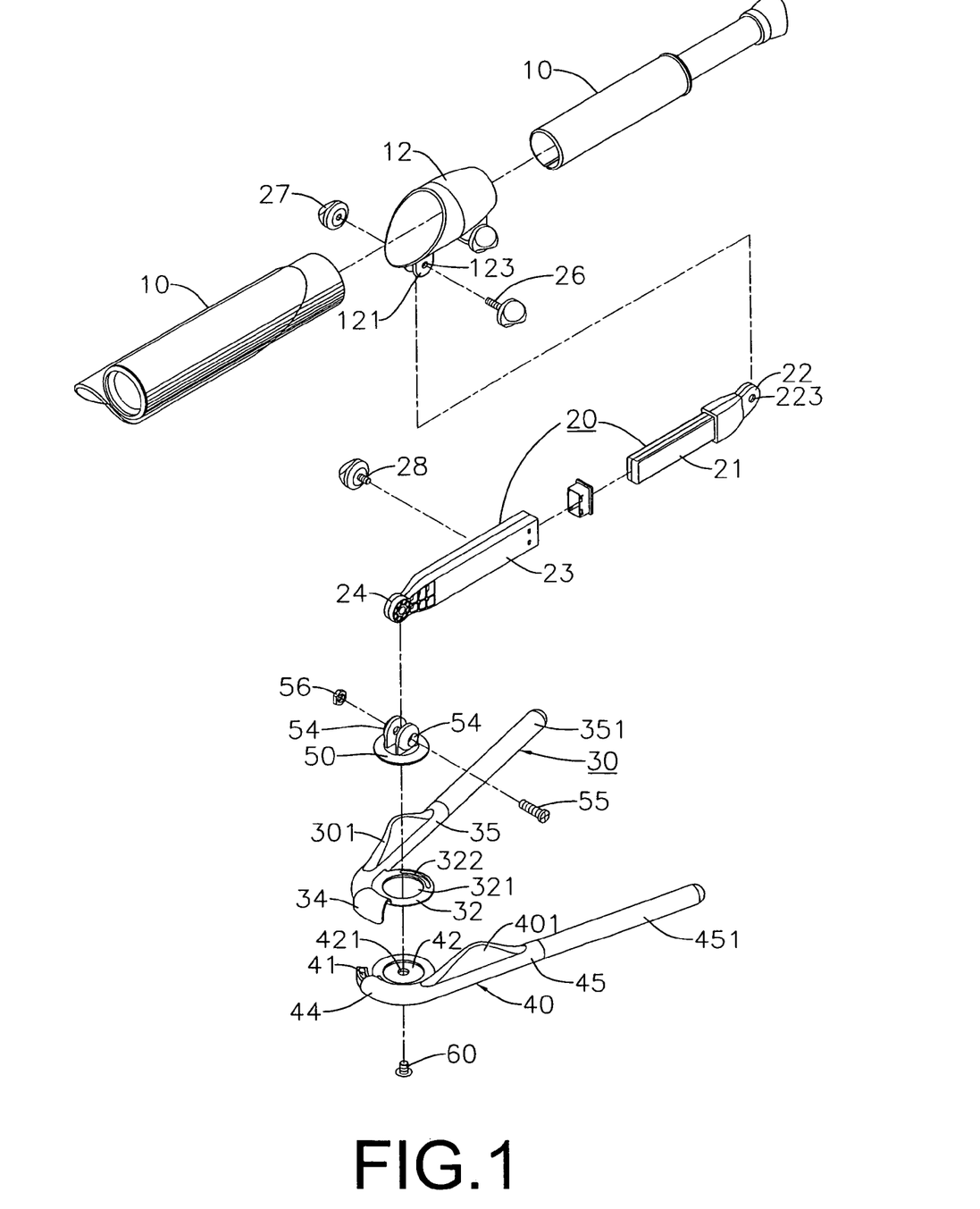
FIG. 1 shows an exploded elevational view of the present invention.
Figure 7:
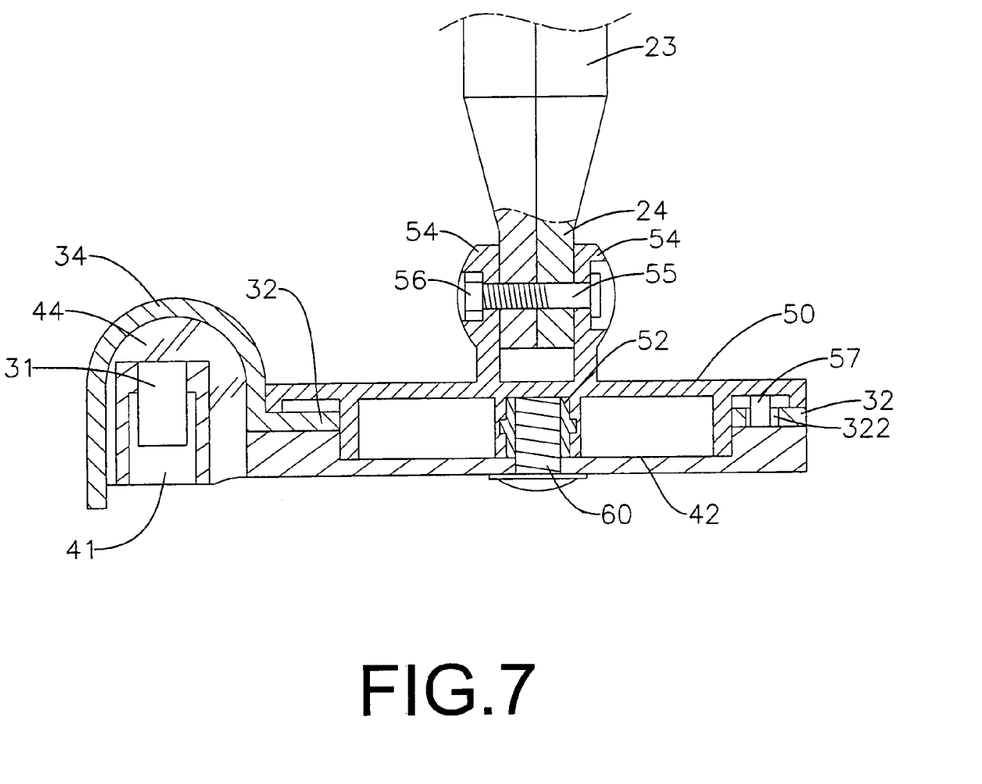
FIG. 7 shows a cross sectional view of the assembly of a left base, a right base and a sliding base of the present invention.

Referring to FIGS. 1 and 7. The present invention relates to a telescope with a foldable and extendable base including a telescope main body 10 being cradled in a socket 12 with a joint base 121;

a stanchion 20 having a lower joint 24 and including an upper joint 22 with a hole 223 formed thereon for connecting with the joint base 121 of the socket 12;

a left base 30 having a ring 32 enclosing an empty part 321, wherein on a lateral of the ring 32 an arc external cover 34 and a left leg 35 formed;

a right base 40 having a circular groove 42 enclosing a small empty part 421, wherein on a lateral of the circular groove 42 an arc body 44, being inserted into the arc external cover 34, and a right leg 45 formed;

a sliding base 50 having a bolting hole 52 and an upper hinge 54 for connecting with the lower joint 24 of the stanchion 20 through a bolt 55 and a nut 56;

a bolt 60 passing through the small empty part 421 and the bolting hole 52 of the sliding base 50 to enable the sliding base 50 sliding round the ring 32 and the arc external cover 34 sliding round the arc body 44.

Figure 5:
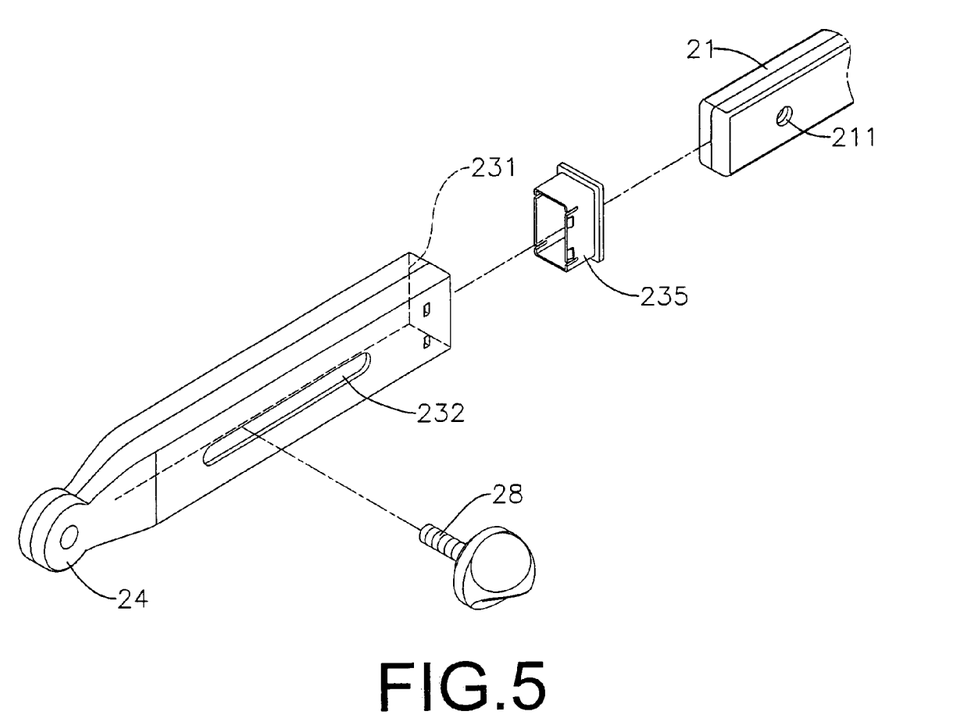
FIG. 5 shows an exploded elevational view of the stanchion of the present invention.

Referring to FIG. 5. The stanchion 20 is formed by inserting an upper stanchion 21 into a lower hollow stanchion 23, wherein the upper stanchion 21 having a bolting hole 211 and the lower hollow stanchion 23 having an entry 231 and a groove 232 on the lateral, thereby enabling a bolt 28 passing through the groove 232 and the bolting hole 211.

Referring to FIG. 1. The joint base 121 of the socket 12 is formed by two ear-like pieces with holes 123 and connection between the joint base 121 of the telescope main body 10 and the upper joint 22 of the stanchion 20 can be made by a bolt 26 passing through holes 123 and the hole 223 of the upper joint 22 and ending with a nut 27.

Referring to FIGS. 1 and 7. A groove 322 is formed on the ring 32 of the left base 30 and a pin 57 formed on the bottom of the sliding base 50, wherein the pin 57 inserted in the groove 322 to enable the pin 57 moving therein. An arc groove 41 formed on an end of the right base 40 and a pin 31 formed on the bottom of the left base 30, wherein the pin 31 inserted in the arc groove 41 to enable the pin 31 moving therein. An arc plate 401 formed on the right base 40 and a long rod 451 formed on the right leg 45. Similarly, an arc plate 301 is formed on the left base 30 and a long rod 351 is formed on the left leg 35.

Examples of Operation

Figure 8:
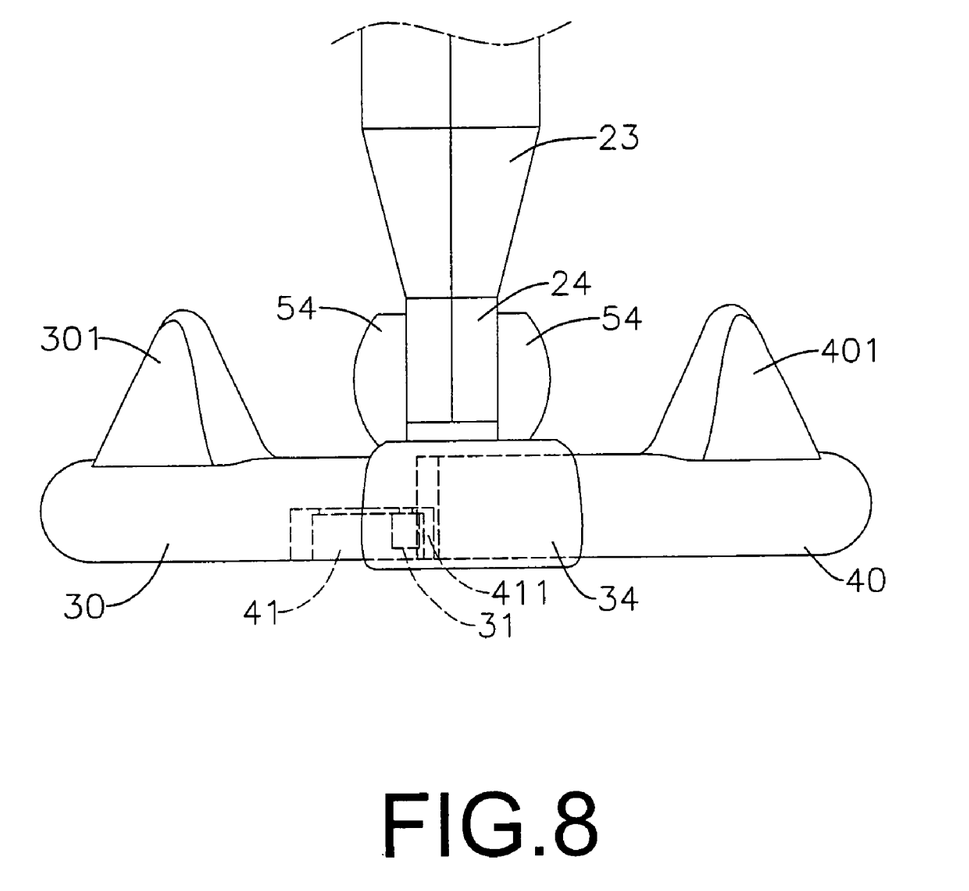
FIG. 8 shows another cross sectional view of the assembly of the left base, the right base and the sliding base of the present invention.
Figure 10:
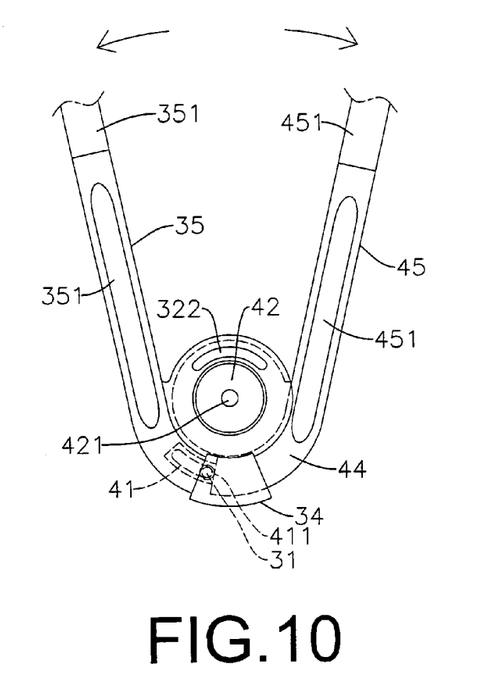
FIG. 10 shows a perspective view of the present invention when left and right bases being extended.

1. Referring to FIGS. 1, 8, and 10. When having long rods 351 and 451 screwed to the right leg 35 and the left leg 45 and by extending long rods 351 and 451 outwards, the movement brings pins 57 and 31 moving in the groove 322 and the arc groove 41, respectively, right and left bases 30 and 40 then rotate in opposite direction round the bolt 60, stability of the telescope main body 10 thereby being enhanced when placing thereof on the ground. For a maximum stability, extending long rods 351 and 451 outwards to the extent that the pin 31 being stopped by an end 411 of the arc groove 41 for a maximum angle therebetween.

Figure 4:
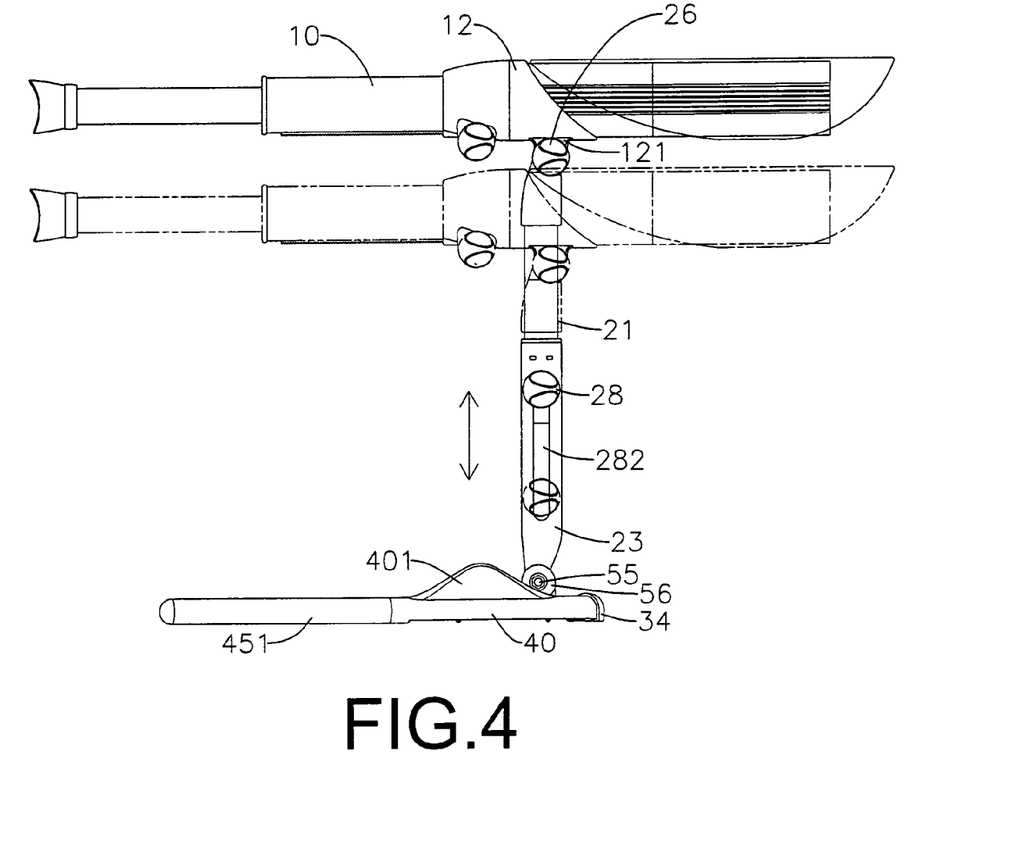
FIG. 4 shows a side view of the present invention in extending a stanchion.

Referring to FIG. 4. When pulling the telescope main body 10 upwards, upper and lower joints 22 and 24 of the stanchion 20 will rotates round bolts 26 and 55, respectively, to raise the telescope main body 10 till reaching an upright position, then locking the bolt 55 with the nut 56 and also securing the bolt 26 with the nut 27, the telescope main body 10 thereby being held in an extended position.

Figure 6:
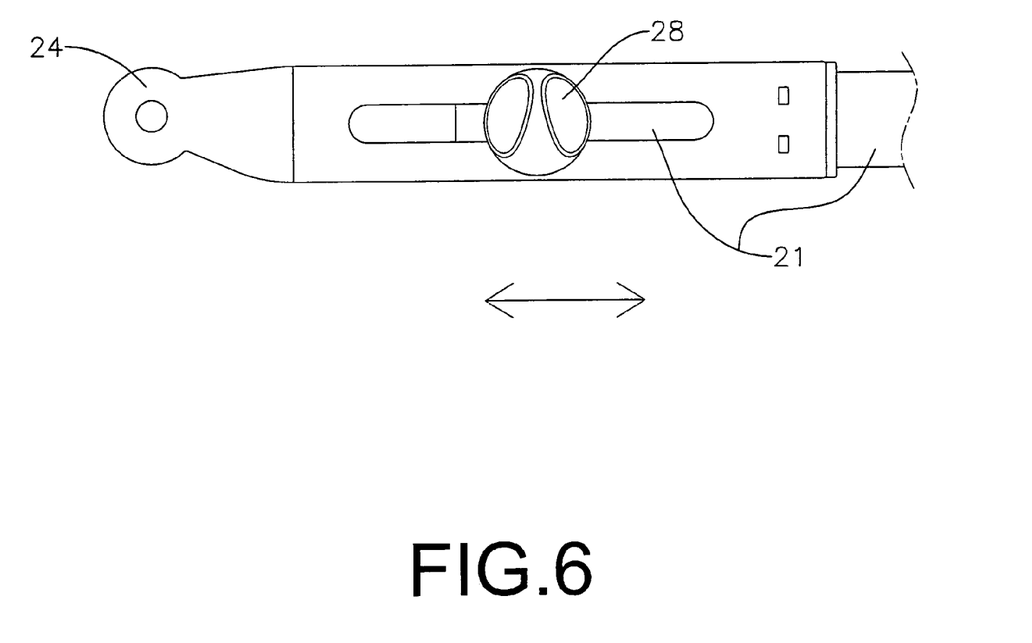
FIG. 6 shows a perspective view of the present invention in adjusting the stanchion length.

Referring to FIGS. 4, 5, and 6. To adjust the height of the telescope main body 10, the length of the stanchion 20 can be adjusted by loosening the bolt 28 first, then moving the upper stanchion 21 up or down through the entry 231 to a desired length, and finally locking the bolt 28 to fix the upper stanchion 21 and the lower hollow stanchion 23. To make a stand-alone telescope main body 10, just pull the upper stanchion 21 out of the entry 231 to make the upper stanchion 21 as a handle for easy holding.

To enhance strength of right and left bases 40 and 30, arc plates 401 and 301 thereby formed.

To enhance strength of the entry 231, a socket 235 thereby formed.

2. Referring to FIG. 7. As the pin 57 being able to slide in the groove 322, the telescope main body 10 thereby being able to be fine tuned horizontally.

Figure 9:
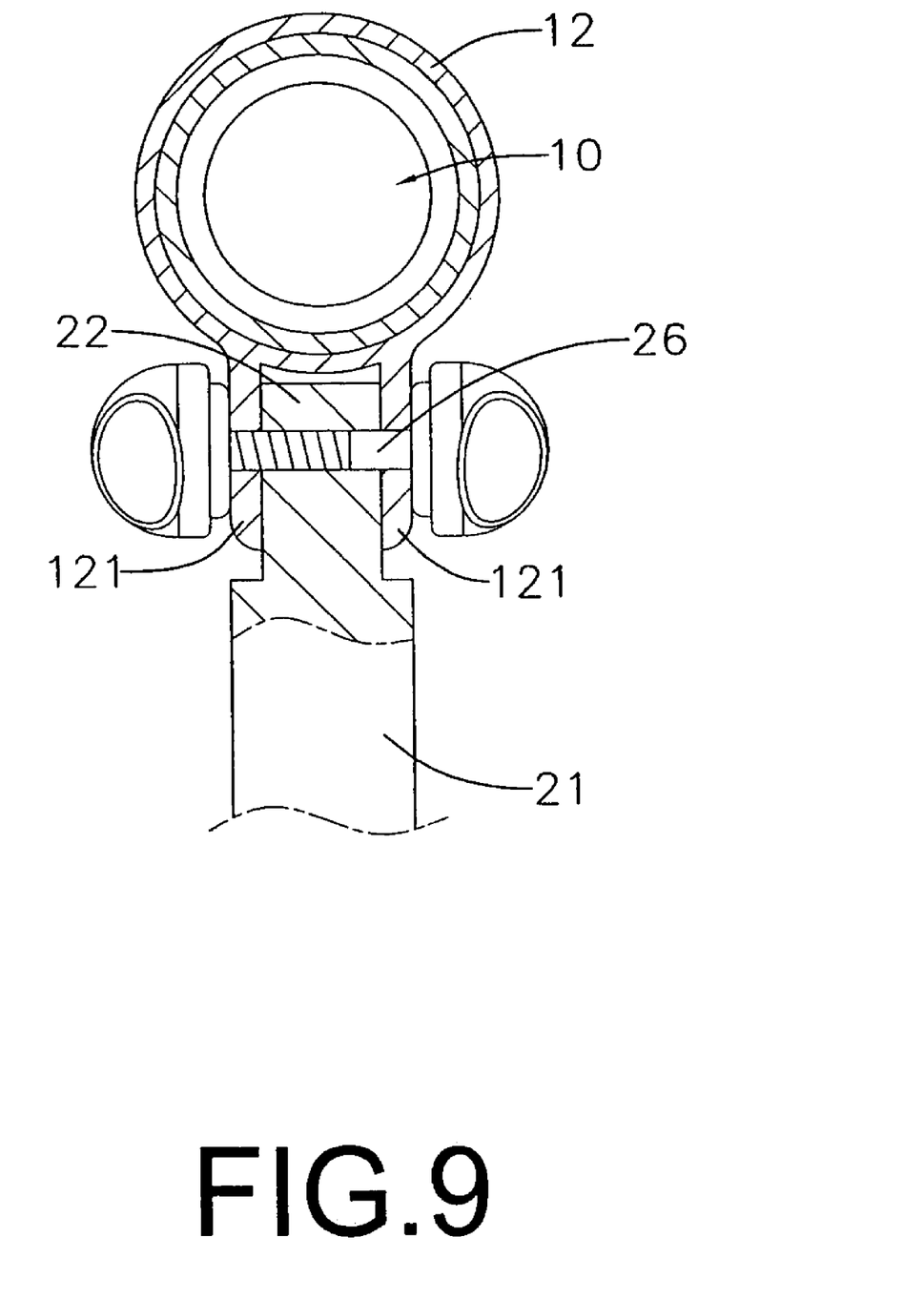
FIG. 9 shows a cross sectional view of a connection between the telescope main body and an upper stanchion of the present invention.

3. Referring to FIG. 9. As the joint base 121 being able to rotate and adjust round the bolt 26 to a desired position before being locked, the telescope main body 10 thereby being able to be fixed in a desired angle for best viewing.

Figure 2:
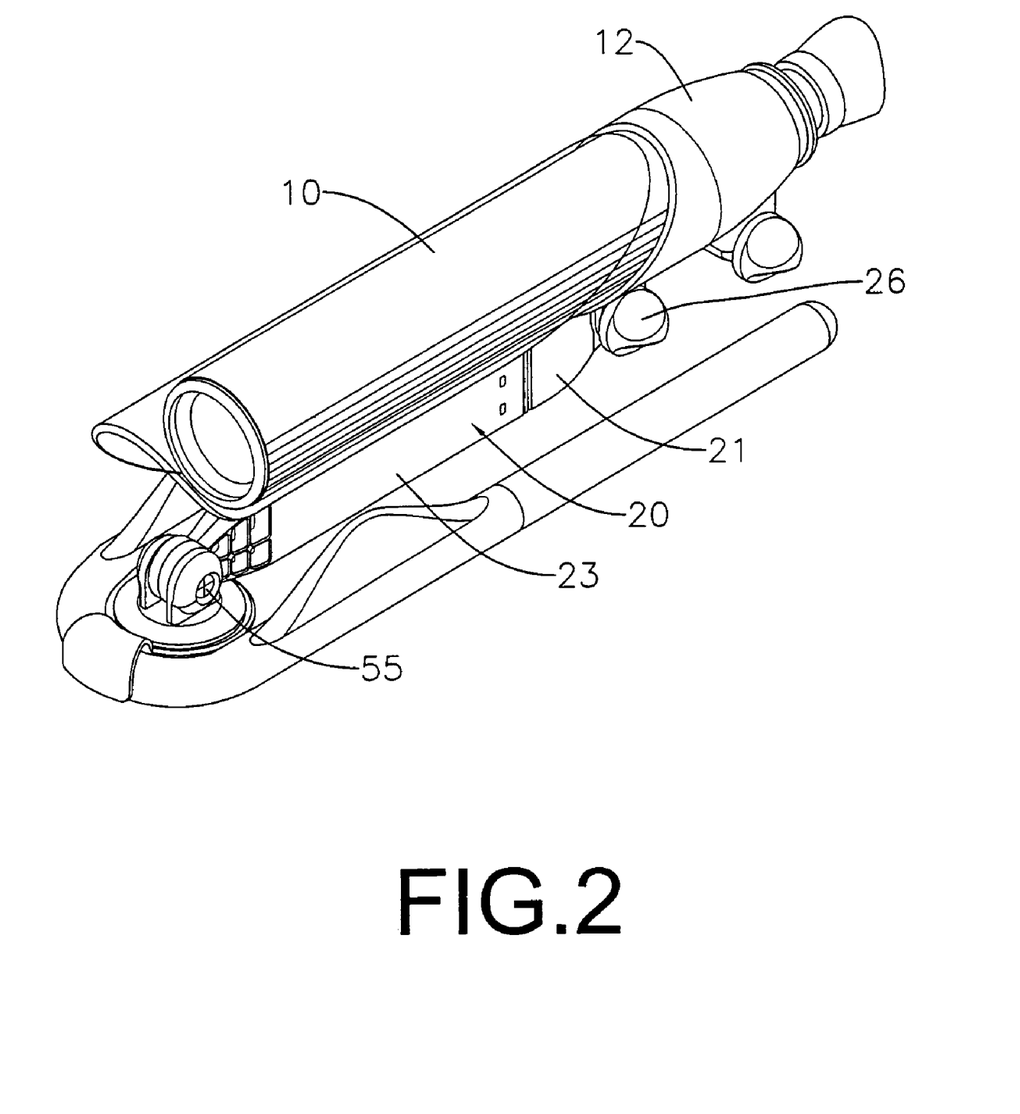
FIG. 2 shows a perspective view of the present invention when folded.
Figure 3:
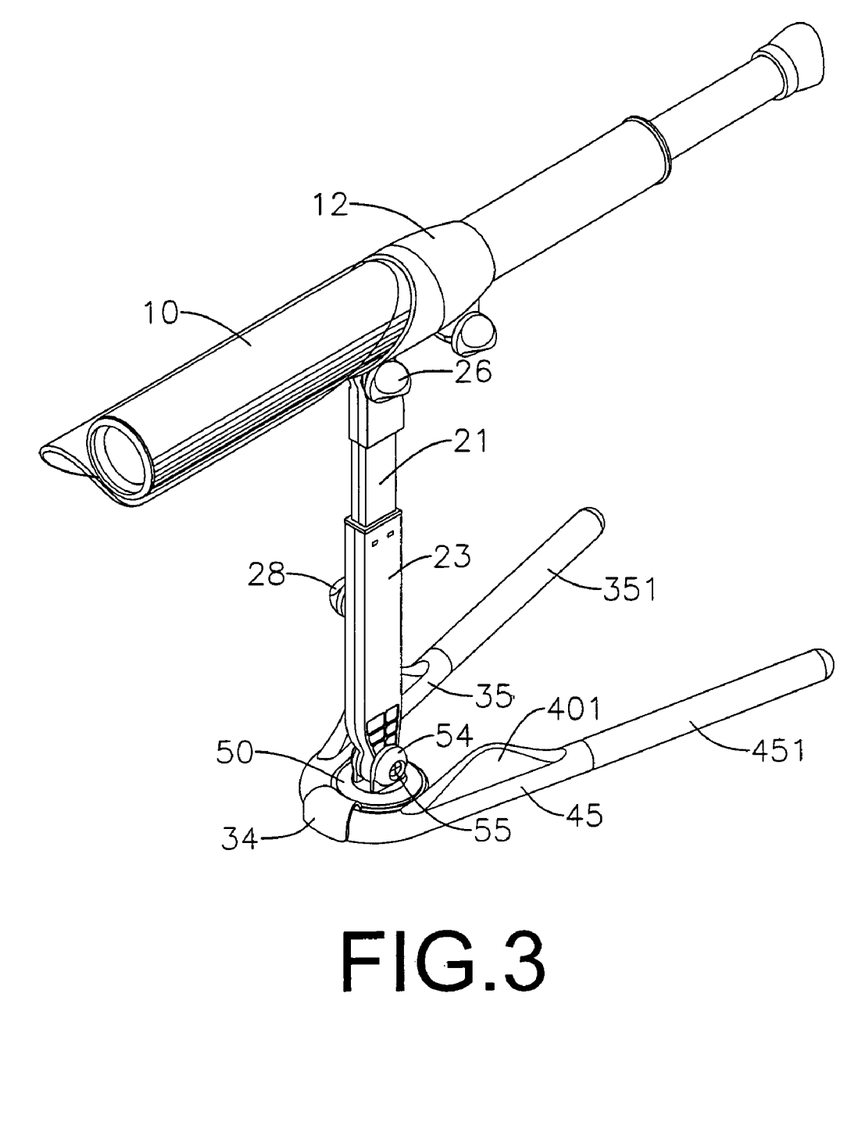
FIG. 3 shows a perspective view of the present invention when extended.
Figure 11:
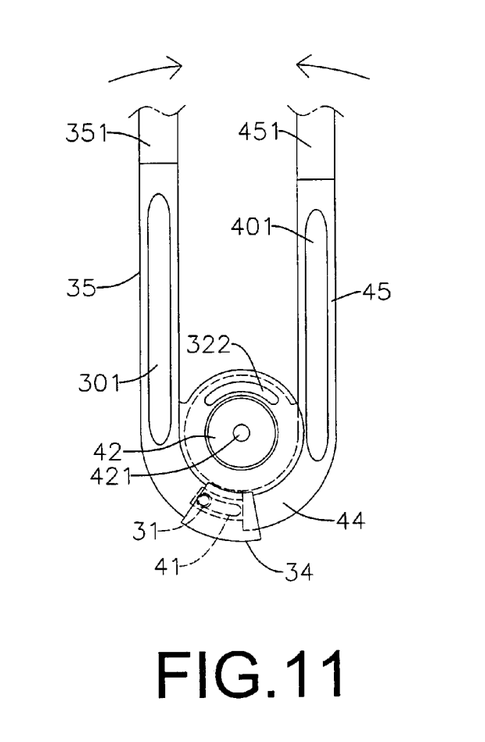
FIG. 11 shows a perspective view of the present invention when left and right bases being closed.

4. Referring to FIGS. 2 and 3. The telescope main body 10 can be folded after use by first loosening bolts 55, 28, and 26, then to nestle the upper stanchion 21 in the lower hollow stanchion 23, and to rotate upper and lower joints 22 and 24 of the stanchion 20 round bolts 26 and 55, respectively, to enable the stanchion 20 folding on the lateral of the telescope main body 10. Referring to FIG. 11. When forcing the right leg 35 and the left leg 45 closer, the arc external cover 34 will rotate in a direction away from the end 411 along the arc body 44 and the right base 30 will rotate round the bolt 60 toward the left base 40 to minimum the distance therebetween, thereby enabling a minimum volume of the whole telescope set.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A telescope with a foldable and extendable base comprising:
   a telescope main body being cradled in a socket with a joint base;
   a stanchion having a lower joint and an upper joint for connecting with the joint base of the socket;
   a left base having a ring enclosing an empty part, wherein on a lateral of the ring an arc external cover and a left leg formed;
   a right base having a circular groove enclosing a small empty part, wherein on a lateral of the circular groove an arc body, being inserted into the arc external cover, and a right leg formed;
   a sliding base having a bolting hole and an upper hinge for connecting with the lower joint of the stanchion through a bolt and a nut;
   a bolt passing through the small empty part of the right base and the bolting hole of the sliding base to enable the sliding base sliding round the ring and the arc external cover sliding round the arc body.

2. The telescope with a foldable and extendable base as recited in claim 1, wherein the stanchion formed by connecting an upper stanchion with a lower hollow stanchion through a entry thereof and securing with a bolt through a bolting hole on the upper stanchion and a groove on the lateral of the lower hollow stanchion.

3. The telescope with a foldable and extendable base as recited in claim 1, wherein the joint base of the socket formed by two ear-like pieces with holes and connection between the joint base of the telescope main body and the upper joint of the stanchion being made by a bolt passing through holes on ear-like pieces and the hole on the upper joint of the stanchion and ending with a nut.

4. The telescope with a foldable and extendable base as recited in claim 1, wherein on the ring of the left base a groove formed with a pin from the bottom of the sliding base inserted and on an end of the right base an arc groove formed with a pin from the bottom of the left base inserted to enable pins moving therein.

5. The telescope with a foldable and extendable base as recited in claim 1, wherein an arc plate formed on each of the right and left bases and a long rod formed on each of the right and left legs.

* * * * *

UNITED STATES PATENT AND TRADEMARK OFFICE
CERTIFICATE OF CORRECTION

PATENT NO. : 7,118,079 B2  Page 1 of 1
APPLICATION NO. : 11/123037
DATED : October 10, 2006
INVENTOR(S) : Su-Ming Kung It is certified that error appears in the above-identified patent and that said Letters Patent is hereby corrected as shown below:

Title Page, Item (75) Inventor: "Su-Min Kung, Shi-Jr (TW)" should read -- Inventor: Su-Min Kung, Hsi Chih (TW) --

Signed and Sealed this

Seventh Day of April, 2009

JOHN DOLL
*Acting Director of the United States Patent and Trademark Office*